US011884474B1

(12) United States Patent
Davidson

(10) Patent No.: US 11,884,474 B1
(45) Date of Patent: Jan. 30, 2024

(54) PRODUCT DISPENSING CLOCK

(71) Applicant: David Davidson, Rancho Cucamonga, CA (US)

(72) Inventor: David Davidson, Rancho Cucamonga, CA (US)

( * ) Notice: Subject to any disclaimer, the term of this patent is extended or adjusted under 35 U.S.C. 154(b) by 0 days.

(21) Appl. No.: 18/051,839

(22) Filed: Nov. 1, 2022

(51) Int. Cl.
*B65D 83/04* (2006.01)
*G04B 47/04* (2006.01)

(52) U.S. Cl.
CPC ......... *B65D 83/0409* (2013.01); *G04B 47/04* (2013.01); *B65D 2583/0436* (2013.01); *B65D 2583/0459* (2013.01); *B65D 2583/0463* (2013.01)

(58) Field of Classification Search
CPC ......................................................... A61J 7/02
See application file for complete search history.

(56) References Cited

U.S. PATENT DOCUMENTS 7,743,923 B2 * 6/2010 Conley ................. A61J 7/0481 221/1
2005/0061825 A1 * 3/2005 Willoughby ............ G07F 11/68 221/2
2013/0116818 A1 * 5/2013 Hamilton .................. A61J 7/04 221/277

* cited by examiner

*Primary Examiner* — Gene O Crawford
*Assistant Examiner* — Ayodeji T Ojofeitimi
(74) *Attorney, Agent, or Firm* — KOS IP Law LLP

(57) ABSTRACT

A product dispensing clock includes a housing and a reservoir arranged in the housing. The reservoir holds a number of dispensable products. A dispenser is arranged in the housing adjacent the reservoir. The dispenser receives at least one of the dispensable products from the reservoir. A collection chamber is defined in the housing. The dispenser dispenses the dispensable products received from the reservoir to the collection chamber for a user to collect the dispensable products. A controller activates the dispenser at a predetermined time interval to dispense the dispensable products to the collection chamber for collection by the user.

19 Claims, 7 Drawing Sheets

PRODUCT DISPENSING CLOCK

CROSS-REFERENCE TO RELATED APPLICATIONS

Not applicable.

FIELD

The present disclosure relates to a clock and, more particularly, to a product dispensing clock.

BACKGROUND

A calendar is a system for keeping track of days, weeks, and months. Calendars can be used to count down an amount of time remaining before an event will occur. For example, a number of days remaining before an event will occur can be tracked by using a calendar and noting each passing day. However, users of a calendar to count down days to an event may lose interest in the calendar and therefore lose track of how many days remain before the event. This may occur as a result of boredom or declining interest in the calendar, and thus the number of days remaining before an upcoming event may become unclear.

SUMMARY

A product dispensing clock can dispense a surprise every day after being loaded by a user with desired dispensable products. For example, a product may be dispensed once per day every day for 15 days leading up to an event. The product dispensing clock can be filled with candy, or any other small item that is desired. Holding balls can be included and each of the holding balls can be loaded with the desired dispensable product.

The product dispensing clock can be changed to suit different events. For example, different clothing or accessories can be added to or removed from the product dispensing clock for different occasions or events.

The product dispensing clock can be hung on a wall or positioned on a shelf or other furniture.

A user can get excited about upcoming events each time a product is dispensed by the product dispensing clock. The user can be reminded about an exciting upcoming event each day leading up to the event.

Provided in accordance with aspects of the present disclosure is a dispensing clock including a housing and a reservoir arranged in the housing. The reservoir holds a number of dispensable products. A dispenser is arranged in the housing adjacent the reservoir. The dispenser receives at least one of the dispensable products from the reservoir. A collection chamber is defined in the housing. The dispenser dispenses the dispensable products received from the reservoir to the collection chamber for a user to collect the dispensable products. A controller activates the dispenser at a predetermined time interval to dispense the dispensable products to the collection chamber for collection by the user.

In an aspect of the present disclosure, storage vessels each include a first portion and a second portion removably coupled with the first portion. Each of the storage vessels is configured to hold at least one dispensable product.

In an aspect of the present disclosure, each of the storage vessels defines a spherical shape.

In an aspect of the present disclosure, the controller includes a computer having a processor and a memory. The memory stores computer instructions executable by the processor to activate the dispenser at the predetermined time interval.

In an aspect of the present disclosure, a time keeping module is configured to control time keeping hands. The controller receives time data from the time keeping module.

In an aspect of the present disclosure, the reservoir is arranged as a conduit connecting a loading orifice with the dispenser.

In an aspect of the present disclosure, the conduit defines a curved shape configured to advance the dispensable products by a force of gravity.

In an aspect of the present disclosure, a storage chamber is defined in the housing. The storage chamber is configured to store the dispensable product. The storage chamber is in communication with the reservoir.

In an aspect of the present disclosure, the predetermined time interval is once per day.

In an aspect of the present disclosure, the dispenser includes a holding chamber and an orifice configured to pass the dispensable products into the collection chamber from the reservoir.

In an aspect of the present disclosure, the dispenser is configured to rotate to dispense the dispensable products received from the reservoir to the collection chamber.

In an aspect of the present disclosure, a motor rotates the dispenser.

In an aspect of the present disclosure, a battery powers the controller.

In an aspect of the present disclosure, an AC or DC jack is configured to receive a power adapter to deliver power to the controller.

In an aspect of the present disclosure, a mechanical clock or a digital clock is in communication with the controller. The controller receives time data from the mechanical clock or the digital clock.

In an aspect of the present disclosure, the controller is programmable to set the predetermined time interval.

In an aspect of the present disclosure, the housing includes a first housing component and a second housing component separable from the first housing component.

In an aspect of the present disclosure, the collection chamber is supported between the first housing component and the second housing component.

In an aspect of the present disclosure, the first housing component defines a first portion of the reservoir and the second housing component defines a second portion of the reservoir.

In an aspect of the present disclosure, the controller includes a circuit board in electrical communication with a motor. The motor drives the dispenser to dispense the dispensable products to the collection chamber for collection by the user.

BRIEF DESCRIPTION OF THE DRAWINGS

Various aspects and features of the present disclosure are described hereinbelow with reference to the drawings wherein.

DETAILED DESCRIPTION

Figure 1:
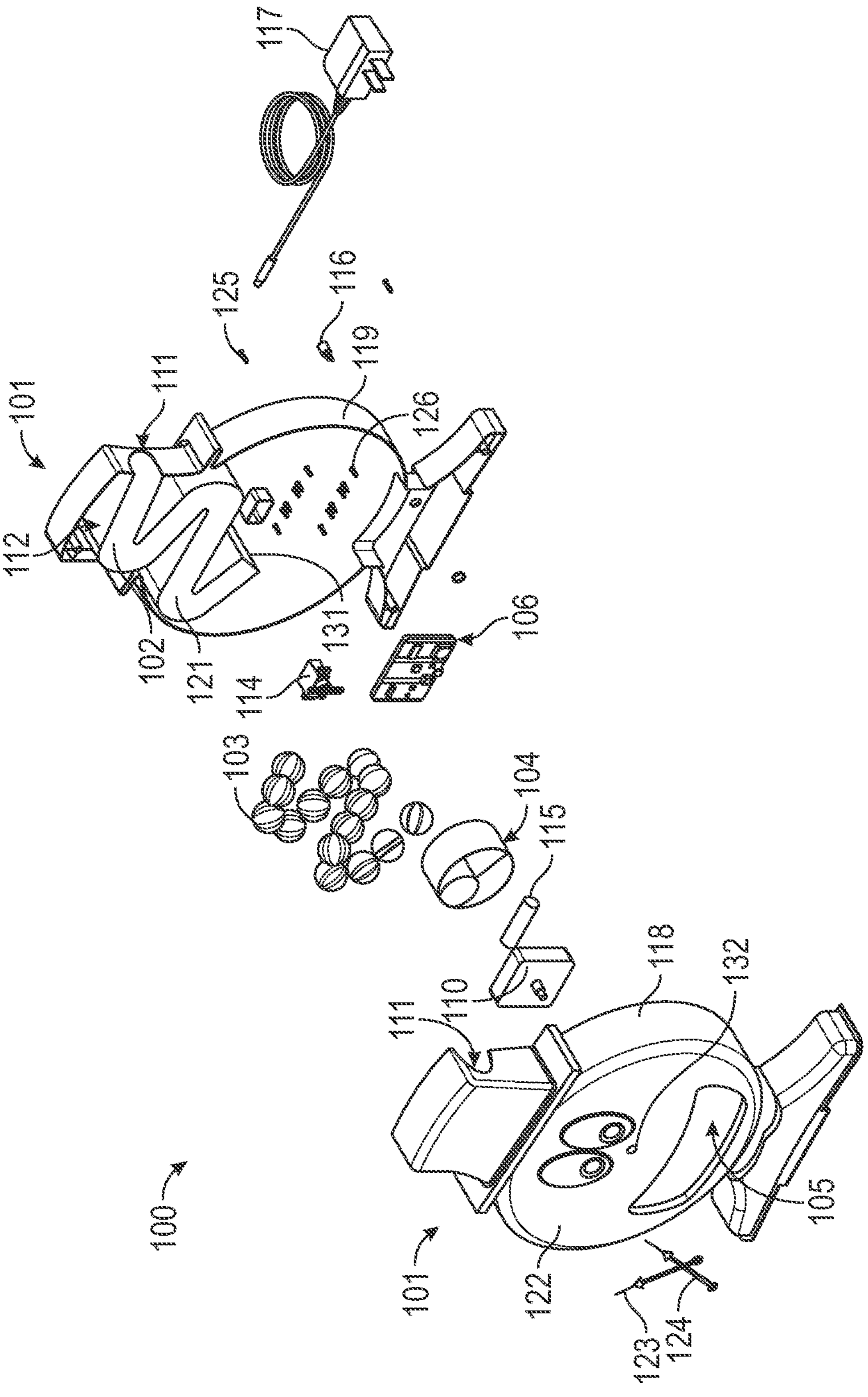
FIG. 1 is an exploded, perspective view of a dispensing clock according to aspects of the present disclosure.
Figure 2A:
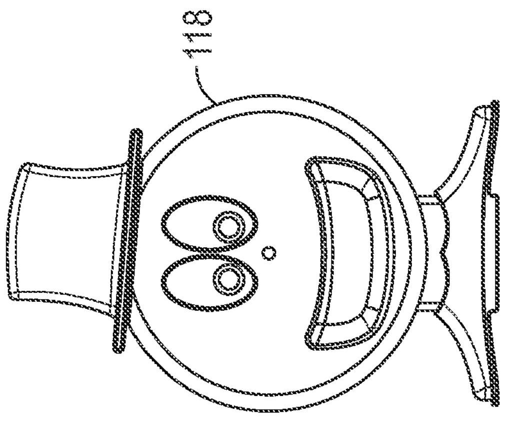
FIG. 2A is a front view of a front housing of the product dispensing clock of FIG. 1.
Figure 2B:
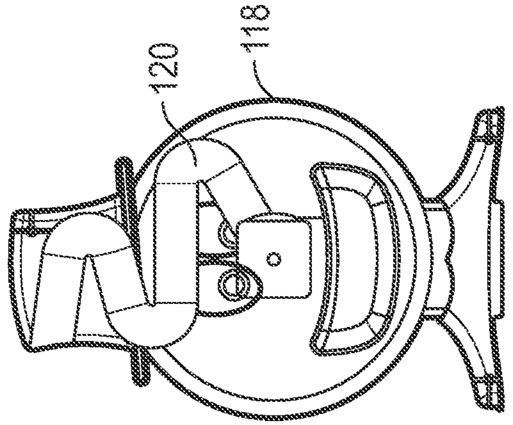
FIG. 2B is a rear view of the front housing of the product dispensing clock of FIG. 1.
Figure 2C:
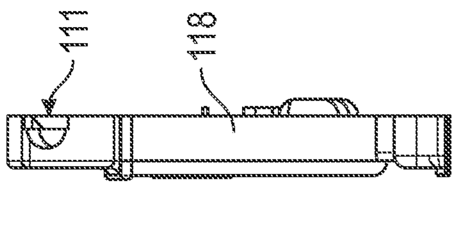
FIG. 2C is a side view of the front housing of the product dispensing clock of FIG. 1.
Figure 2D:
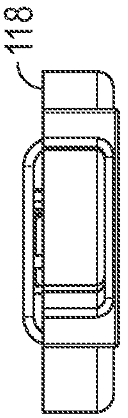
FIG. 2D is a top plan view of the front housing of the product dispensing clock of FIG. 1.
Figure 3B:
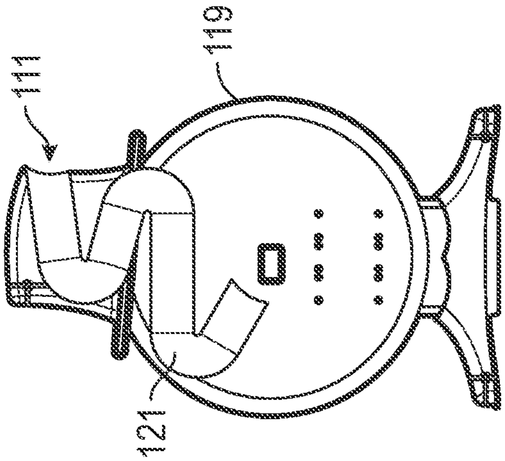
FIG. 3B is a front view of the rear housing of the product dispensing clock of FIG. 1.
Figure 3D:
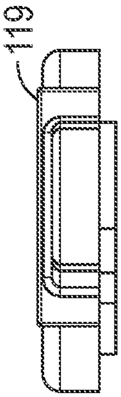
FIG. 3D is a top plan view of the rear housing of the product dispensing clock of FIG. 1.
Figure 3A:
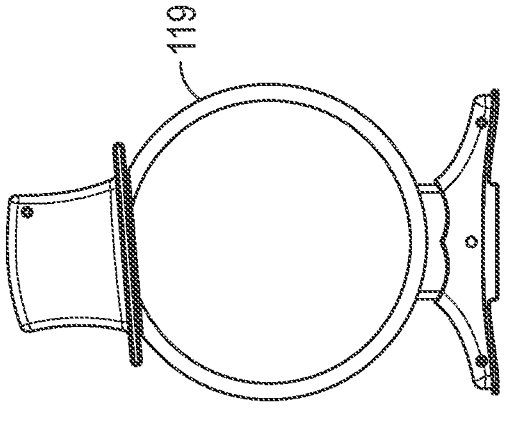
FIG. 3A is a rear view of a rear housing of the product dispensing clock of FIG. 1.
Figure 3C:
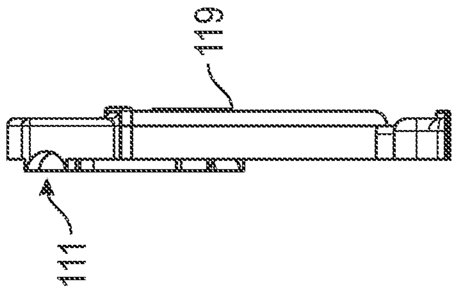
FIG. 3C is a side view of the rear housing of the product dispensing clock of FIG. 1.

A product dispensing clock 100 is disclosed herein. The clock 100 can be programmed to release a product 103 periodically (e.g., the same time every day) for a preset number of days. For example, in the lead up to Christmas, the clock 100 can dispense one product 103 every morning at 8 am. To accomplish the same, the clock 100 may have a reservoir 102 which holds a plurality of storage vessels 107. One product 103 may be encased or held within each storage vessel 107. The storage vessels 107 are lined up in the reservoir 102 and one storage vessel 107 is disposed within the holding chamber 113 of the dispenser 104. At the programmed time, a controller 106 activates a motor 114 to rotate the dispenser 104 one revolution in the counterclockwise direction. The one storage vessel 107 which was disposed in the holding chamber 113 is dropped into the collection chamber 105. The dispenser 104 continues to rotate and when the holding chamber 113 is aligned underneath an exit 131 of the reservoir 102, the bottom most storage vessel 107 in the reservoir 102 is then gravity fed into the holding chamber 113 to be dispensed during the next rotational cycle of the dispenser 104.

Figure 4A:
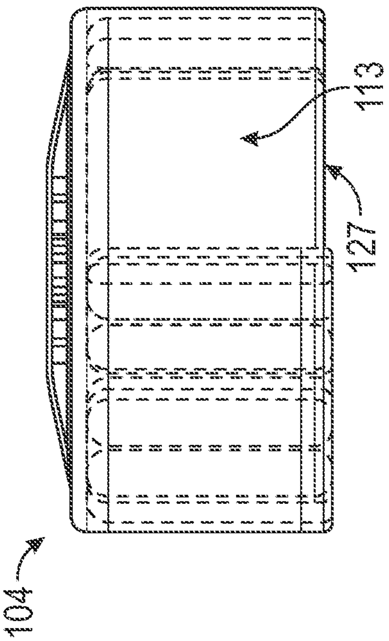
FIG. 4A is a top plan view of a dispenser of the product dispensing clock of FIG. 1.
Figure 4B:
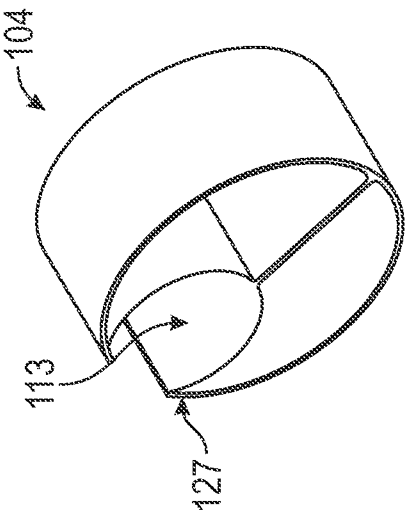
FIG. 4B is a perspective view of the dispenser of the product dispensing clock of FIG. 1.
Figure 4C:
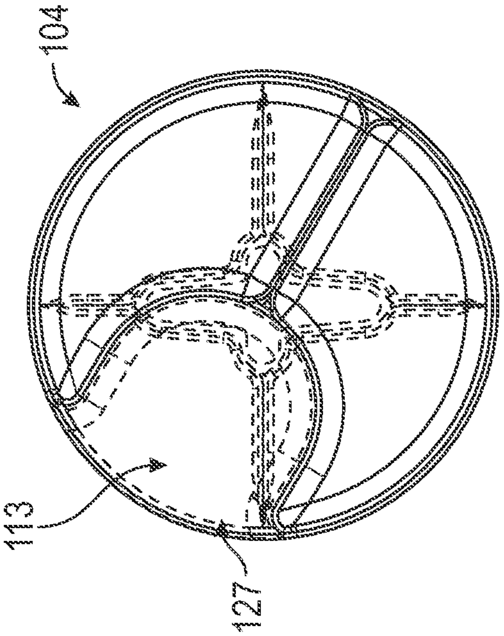
FIG. 4C is a cross-sectional view of the dispenser of the product dispensing clock of FIG. 1.
Figure 4D:
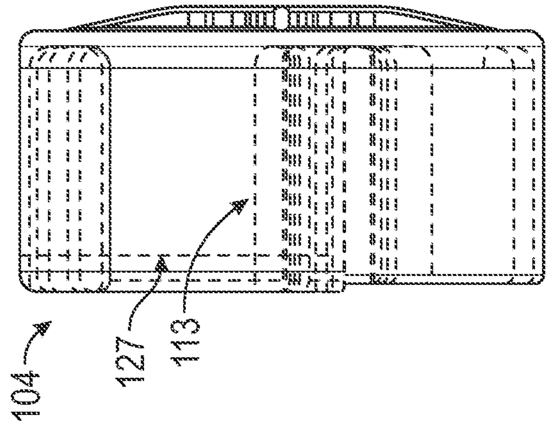
FIG. 4D is a side view of the dispenser of the product dispensing clock of FIG. 1.
Figure 5B:
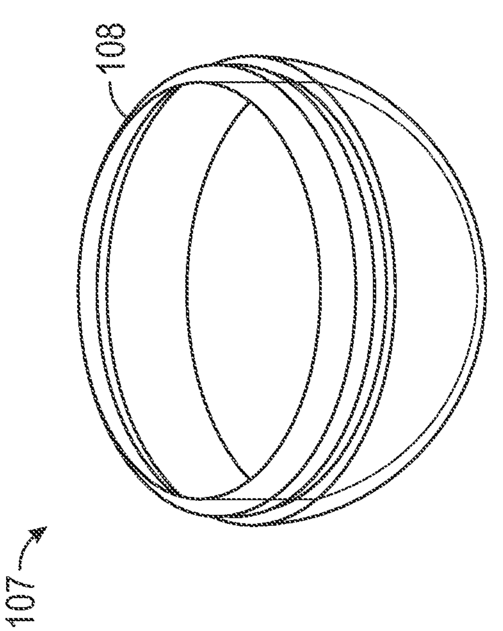
FIG. 5B is a perspective view of the first portion of the storage vessel of the product dispensing clock of FIG. 1.
Figure 5D:
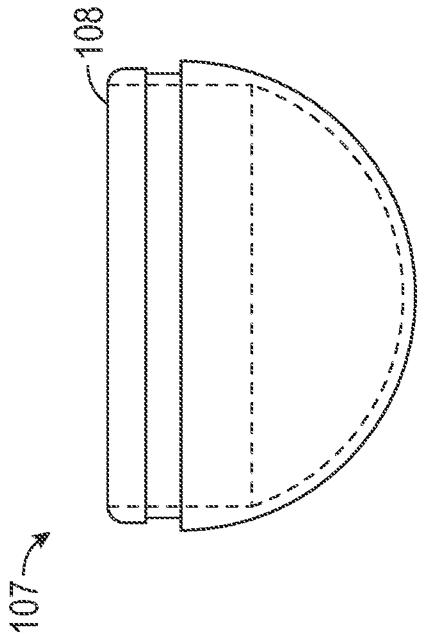
FIG. 5D is a second side view of the first portion of the storage vessel of the product dispensing clock of FIG. 1.
Figure 5A:
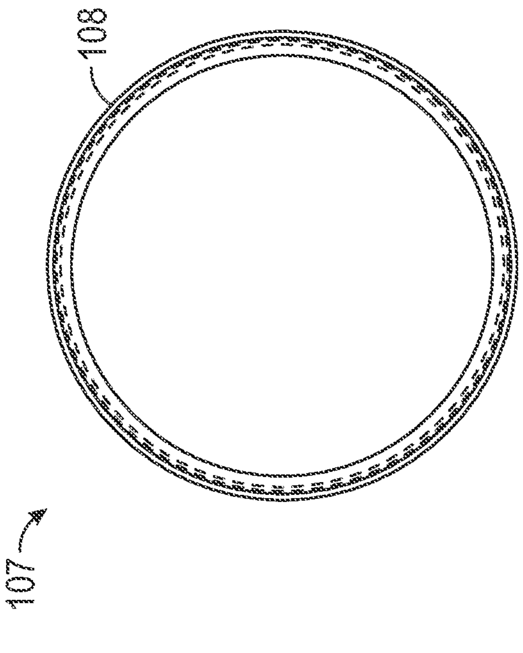
FIG. 5A is a top plan view of a first portion of a storage vessel of the product dispensing clock of FIG. 1.
Figure 5C:
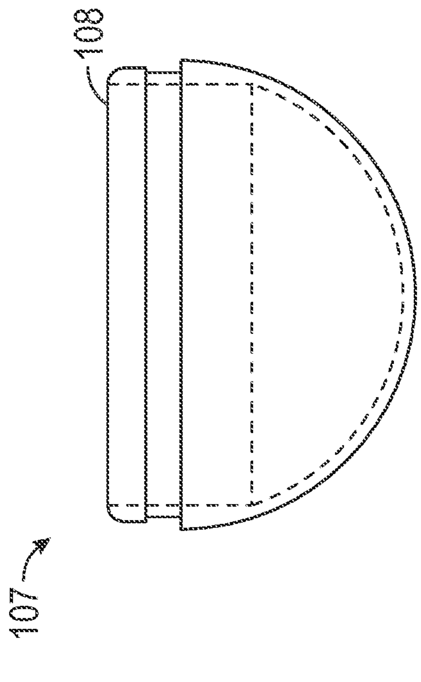
FIG. 5C is a first side view of the first portion of the storage vessel of the product dispensing clock of FIG. 1.
Figure 6A:
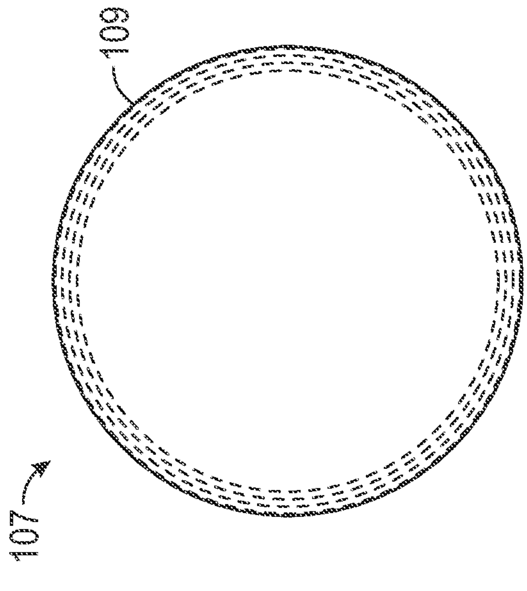
FIG. 6A is a top plan view of a second portion of the storage vessel of the product dispensing clock of FIG. 1.
Figure 6B:
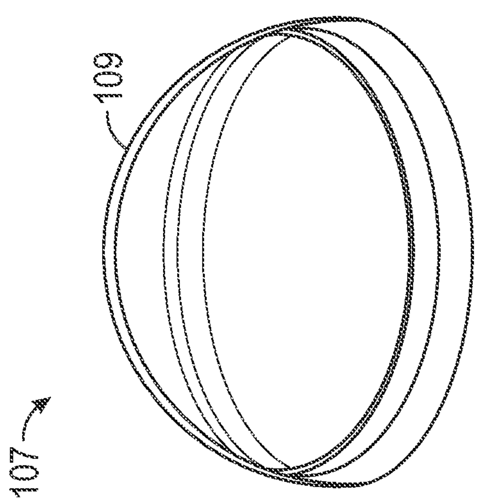
FIG. 6B is a perspective view of the second portion of the storage vessel of the product dispensing clock of FIG. 1.
Figure 6C:
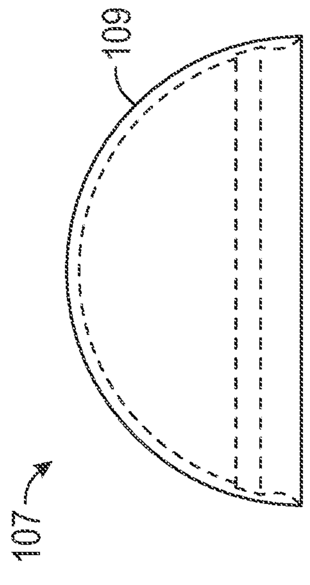
FIG. 6C is a first side view of the second portion of the storage vessel of the product dispensing clock of FIG. 1.
Figure 6D:
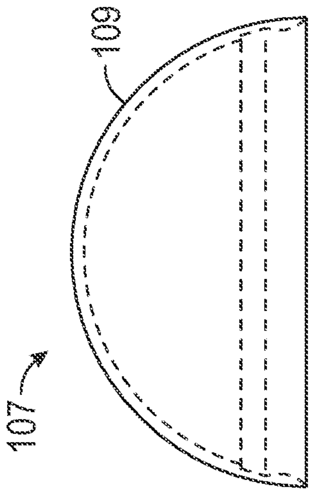
FIG. 6D is a second side view of the second portion of the storage vessel of the product dispensing clock of FIG. 1.

Referring to FIG. 1, a product dispensing clock 100 includes a housing 101 and a reservoir 102 arranged in the housing 101. The reservoir 102 holds a number of dispensable products 103. A dispenser 104 (see, e.g., FIGS. 1 and 4B) is arranged in the housing 101 adjacent the reservoir 102. The dispenser 104 receives at least one of the dispensable products 103 from the reservoir 102. The reservoir 102 is arranged as a conduit connecting a loading orifice 111 defined at an upper portion of the housing 101 with the dispenser 104. The reservoir 102 may define a curved shape configuration to advance the dispensable products 103 by a force of gravity.

The dispensable products 103 may be loaded into storage vessels 107 (see, e.g., FIGS. 5A to 6D). The dispensable products 103 and the storage vessels 107 are shaped and dimensioned to fit through the loading orifice 111 and to be arranged in-line with each other within the reservoir 102 so that the dispensable products 103 and the storage vessels 107 will advanced downwardly through the reservoir 102 and toward the dispenser 104 by the act of gravity alone. This arrangement of the dispensable products 103 and the storage vessels 107 in the reservoir 102 allows the dispensable products 103 to de dispensed one at a time.

A collection chamber 105 is defined in the housing 101. The dispenser 104 dispenses the dispensable products 103 received from the reservoir 102 to the collection chamber 105 for a user to collect the dispensable products 103. As an example, the collection chamber 105 may be an opening in a front side 122 of the housing 101.

A controller 106 activates a motor 114 which rotates the dispenser 104 a predetermined angular rotation and at a predetermined time interval to dispense the dispensable products 103 to the collection chamber 105 for collection by the user.

The controller 106 may include a computer 700 (see, e.g., FIG. 7 described in more detail below) having a processor 701 and a memory 702. The memory 702 stores computer instructions executable by the processor 701 to activate the dispenser 104 at the predetermined time interval. The controller 106 may include a circuit board in electrical communication with motor 114 and configured to activate the motor 114 to drive the dispenser 104 (e.g., to rotate the dispenser 104).

The components of the product dispensing clock 100 (e.g., the controller 106, the time keeping module 110, and/or the motor 114) may be powered by a battery 115, such as a rechargeable battery. As an example, the battery 115 may be an alkaline battery, a nickel metal hydride battery, or a lithium ion battery. Alternatively, or in conjunction with use of the battery 115, the components of the product dispensing clock 100 may be powered by an AC or DC jack 116 configured to receive electrical power form a power adapter 117.

In an aspect of the present disclosure, the product dispensing clock 100 includes a time keeping module 110 configured to control time keeping hands (see, e.g., time keeping hands 123 and 124 in FIG. 1). The time keeping hands can be used to display a time to a user of the product dispensing clock 100. The time keeping hands may include, hour, minute, and second hands. A digital display may also be employed to communicate the time of day to a user of the product dispensing clock 100. The controller 106 receives time data from the time keeping module 110 to determine when it is time to dispense a dispensable product 103. As an example, a mechanical clock or a digital clock may be in communication with the controller 106. The controller 106 may receive the time data from the mechanical clock or the digital clock.

In use, the product dispensing clock 100 is loaded with desired dispensable products 103. The dispensable products 103 are generally loaded into the storage vessels 107, and the storage vessels 107 including the dispensable products 103 can then be loaded into the product dispensing clock 100 by using the storage vessels 107 that are holding the dispensable products 103. The time at which the product dispensing clock 100 will dispense the dispensable products 103 can be custom programmed by a user. When the product dispensing clock 100 is first set up, the product dispensing clock 100 will dispense a first product relatively quickly (e.g., between 1 to 300 seconds) after the product dispensing clock 100 is programmed to confirm that the product dispensing clock 100 is on and successfully programmed. The product dispensing clock 100 will then dispense one of the dispensable products 103 each day leading up to an event. For example, the product dispensing clock 100 may be programmed to dispense one of the dispensable products 103 at the same time each day for 15 days leading up to an event. However, the daily time at which one of the dispensable products 103 is dispensed and the number of days for which a dispensable product 103 will be dispensed can be programmed, as desired.

The spherical shape of the storage vessels 107 facilitates gravity feeding of the storage vessels 107 through the reservoir 102. However, in the case of a dispensable product 103 that is shaped and dimensioned to be gravity fed through the reservoir 102 without the use of the storage vessels 107, the storage vessels 107 may be omitted, and dispensable products 103 can be directly loaded into the reservoir 102 without the use of the storage vessels 107. For example, a spherical product, such as a toy ball can be loaded into the reservoir 102 without the use of the storage vessels 107. It is also contemplated that non-spherical dispensable products 103 can be loaded into the reservoir 102 without the use of the storage vessels 107 if the non-spherical dispensable products 103 are shaped and dimensioned to be gravity fed through the reservoir 102 without the use of the storage vessels 107.

The product dispensing clock 100 may be programmed by using a programmable button 132 that can be used to enter a series of commands entered using single taps, multiple taps, or holding the programmable button 132. For example, set the time, then set AM or PM to program the controller 106 to rotate the motor 114 to rotate the dispenser 104 one revolution so that one storage vessel 107 comes out at that time in the evening if PM was programmed or in the morning if AM Was programmed.

In an aspect of the present disclosure, the housing 101 includes a first housing component 118 and a second housing component 119 separable from the first housing component 118. As an example, a plurality of screws 125 may removably couple the first housing component 118 and the second housing component 119 to each other.

The collection chamber 105 may be supported between the first housing component 118 and the second housing component 119. For example, a plurality of pins 126 may extend from the first housing component 118 and/or the second housing component 119 to secure the collection chamber 105 below the dispenser 104.

In an aspect of the present disclosure, the first housing component 118 defines a first portion 120 of the reservoir 102 and the second housing component 119 defines a second portion 121 of the reservoir 102.

In an aspect of the present disclosure, a storage chamber 112 is defined in the housing 101. The storage chamber 112 is configured to store the dispensable product 103. The storage chamber 112 is in communication with the reservoir 102. The storage chamber 112 may be employed to increase the number of dispensable products 103 that can be stored within the housing 101. As an example, the reservoir 102 may hold from 1-15 dispensable products 103, and the storage chamber 112 may hold an additional 1-15 dispensable products 103 for loading into the reservoir 102 and to be dispensed by the dispenser 104.

Referring particularly to FIGS. 4A to 4D, the dispenser 104 includes a holding chamber 113 and an orifice 127 configured to pass the dispensable products 103 into the collection chamber 105 from the reservoir 102. In use, a single dispensable product 103 (e.g., a dispensable product 103 in a storage vessel 107) is transferred from the reservoir 102 and into the holding chamber 113 of the dispenser 104 through orifice 127 facing the reservoir 102 when the orifice 127 of the holding chamber 113 of the dispenser 104 is below and aligned to the exit 131 of the reservoir 102 for gravity feeding the storage vessel 107. Preferably, the orifice 127 of the holding chamber 113 of the dispenser 104 is below and aligned to the exit 131 of the reservoir 102 to promote the storage vessel 107 to drop into the holding chamber 113. During the day, people might jostle the clock 100 and thus promote the storage vessel 107 to drop into the holding chamber 113 if the storage vessel 107 was caught on an edge or protuberance. The dispensable product 103 is then transferred by the dispenser 104 and into the collection chamber 105. The dispensable product 103 can be dropped back through the orifice 127 and into the collection chamber 105 as a result of the force of gravity.

In an aspect of the present disclosure, the dispenser 104 is configured to rotate to dispense the dispensable products 103 received from the reservoir 102 to the collection chamber 105. As an example, a motor 114 rotates the dispenser 104 between a first position in which the orifice 127 faces the reservoir 102 and a second position in which the orifice 127 faces the collection chamber 105. The dispensable product 103 (e.g., a dispensable product in a storage vessel 107) is dropped through the orifice 127 and into the collection chamber 105 when the dispenser 104 is rotated to the second position. The dispenser 104 can then be rotated to a third position between the first position and the second position in which the orifice 127 does not face the reservoir 102 or the collection chamber 105. The controller 106 controls the dispenser 104 to rotate from the third position to the first position to collect another dispensable product 103 on or about the predetermined time interval (e.g., once per day).

Referring particularly to FIGS. 5A to 6D, the storage vessels 107 may each include a first portion 108 and a second portion 109 removably coupled with the first portion 108. Each of the storage vessels 107 is configured to hold at least one dispensable product 103. In use, a dispensable product 103 can be loaded into the first portion 108 and then the second portion 109 is removably coupled with the first portion 108 to hold the dispensable product 103 in the storage vessel 107 until it is collected by a user.

As an example, the first portion 108 may be removably secured to the second portion 109 by a snap fit connection.

In an aspect of the present disclosure, each of the storage vessels 107 defines a spherical shape.

Figure 7:
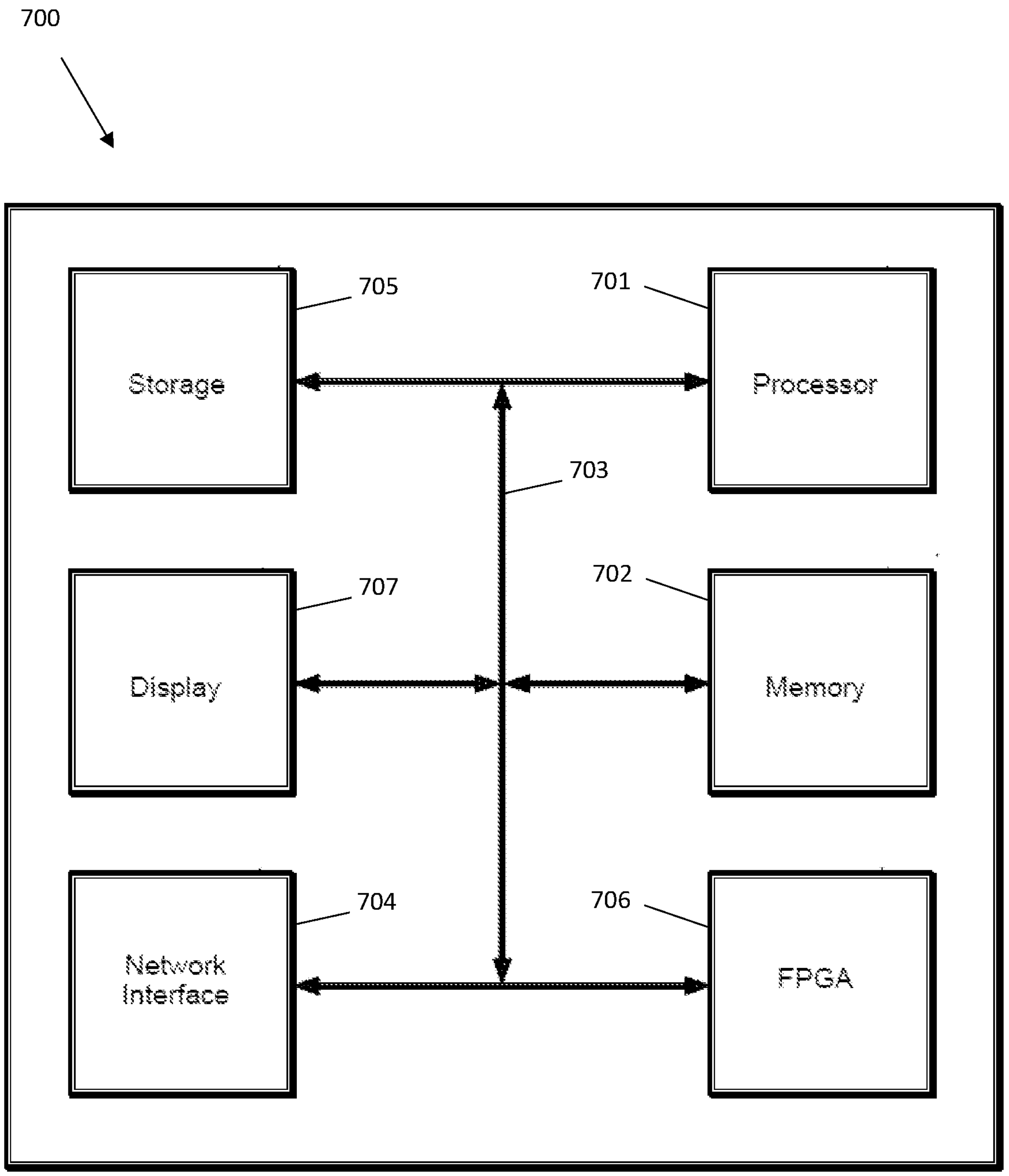
FIG. 7 is a block diagram of an exemplary computer employable by the device, system, and method described herein according to aspects of the present disclosure.

Referring to FIG. 7, a general-purpose computer 700 employable by the controller 106 is described. The general-purpose computer 700 can be employed by the controller 106 to perform the various functions described herein. The computer 700 may include a processor 701 connected to a computer-readable storage medium or a memory 702 which may be a volatile type memory, e.g., RAM, or a non-volatile type memory, e.g., flash media, disk media, etc. The processor 701 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 702 can be random access memory, read-only memory, magnetic disk memory, solid state memory, optical disc memory, and/or another type of memory. The memory 702 can communicate with the processor 701 through communication buses 703 of a circuit board and/or through communication cables such as serial ATA cables or other types of cables. The memory 702 includes computer-readable instructions that are executable by the processor 701 to operate the computer 700 to execute the various functions described herein. The computer 700 may include a network interface 704 to communicate (e.g., through a wired or wireless connection) with other computers or a server. A storage device 705 may be used for storing data. The computer 700 may include one or more FPGAs 706. The FPGAs 706 may be used for executing various functions described herein. A display 707 may be employed to display data processed by the computer 700.

While a single dispensable product 103 is described in some examples herein as being dispensed (e.g., by using a storage vessel 107), the present inventive concept is not limited thereto, and multiple dispensable products 103 (e.g., multiple dispensable products 103 held in a storage vessel 107) can be dispensed at each predetermined time interval.

Exemplary configurations of the disclosure are described herein (e.g., with reference to the accompanying drawings). Like reference numerals may refer to like elements throughout the specification and drawings.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A dispensing clock, comprising:

a housing;

a reservoir arranged in the housing, wherein the reservoir is configured to hold a plurality of dispensable products;

a dispenser arranged in the housing adjacent the reservoir, wherein the dispenser is configured to receive at least one dispensable product of the plurality of dispensable products from the reservoir;

a collection chamber defined in the housing, wherein the dispenser is configured to dispense the at least one dispensable product of the plurality of dispensable products received from the reservoir to the collection chamber for a user to collect the at least one dispensable product of the plurality of dispensable products; and a controller configured to activate the dispenser at a predetermined time interval to dispense the at least one dispensable product of the plurality of dispensable products to the collection chamber for collection by the user;

a storage chamber defined in the housing, wherein the storage chamber is configured to store the dispensable product, and wherein the storage chamber is in communication with the reservoir.

2. The dispensing clock of claim of claim 1, wherein the controller includes a circuit board in electrical communication with a motor, and wherein the motor is configured to drive the dispenser to dispense the at least one dispensable product of the plurality of dispensable products to the collection chamber for collection by the user.

3. The dispensing clock of claim 1, further including at least one battery configured to power the controller.

4. The dispensing clock of claim 1, further including an AC or DC jack configured to receive a power adapter to deliver power to the controller.

5. The dispensing clock of claim 1, further including a mechanical clock or a digital clock in communication with the controller, wherein the controller receives time data from the mechanical clock or the digital clock.

6. The dispensing clock of claim 1, wherein the controller is programmable to set the predetermined time interval.

7. The dispensing clock of claim 1, wherein the predetermined time interval is once per day.

8. The dispensing clock of claim 1, wherein the controller includes a computer having a processor and a memory, the memory storing computer instructions executable by the processor to activate the dispenser at the predetermined time interval.

9. The dispensing clock of claim 8, further including a time keeping module configured to control time keeping hands, wherein the controller receives time data from the time keeping module.

10. The dispensing clock of claim 1, wherein the reservoir is arranged as a conduit connecting a loading orifice with the dispenser.

11. The dispensing clock of claim 10, wherein the conduit defines a curved shape configured to advance the plurality of dispensable products by a force of gravity.

12. The dispensing clock of claim 1, wherein the housing includes a first housing component and a second housing component separable from the first housing component.

13. The dispensing clock of claim 12, wherein the collection chamber is supported between the first housing component and the second housing component.

14. The dispensing clock of claim 12, wherein the first housing component defines a first portion of the reservoir, and the second housing component defines a second portion of the reservoir.

15. A dispensing clock, comprising:

a housing;

a reservoir arranged in the housing, wherein the reservoir is configured to hold a plurality of dispensable products;

a dispenser arranged in the housing adjacent the reservoir, wherein the dispenser is configured to receive at least one dispensable product of the plurality of dispensable products from the reservoir;

a collection chamber defined in the housing, wherein the dispenser is configured to dispense the at least one dispensable product of the plurality of dispensable products received from the reservoir to the collection chamber for a user to collect the at least one dispensable product of the plurality of dispensable products; and a controller configured to activate the dispenser at a predetermined time interval to dispense the at least one dispensable product of the plurality of dispensable products to the collection chamber for collection by the user;

wherein the dispenser includes a holding chamber and an orifice configured to pass the at least one dispensable product of the plurality of dispensable products into the holding chamber from the reservoir.

16. The dispensing clock of claim 15, wherein the dispenser is configured to rotate to dispense the at least one dispensable product of the plurality of dispensable products received from the reservoir to the collection chamber.

17. The dispensing clock of claim 16, further including a motor configured to rotate the dispenser.

18. A dispensing clock, comprising:

a housing;

a reservoir arranged in the housing, wherein the reservoir is configured to hold a plurality of dispensable products;

a dispenser arranged in the housing adjacent the reservoir, wherein the dispenser is configured to receive at least one dispensable product of the plurality of dispensable products from the reservoir;

a collection chamber defined in the housing, wherein the dispenser is configured to dispense the at least one dispensable product of the plurality of dispensable products received from the reservoir to the collection chamber for a user to collect the at least one dispensable product of the plurality of dispensable products; and a controller configured to activate the dispenser at a predetermined time interval to dispense the at least one dispensable product of the plurality of dispensable products to the collection chamber for collection by the user;

a plurality of storage vessels including a first portion and a second portion removably coupled with the first portion, wherein each of the storage vessel of the plurality of storage vessels is configured to hold the at least one dispensable product of the plurality of dispensable products.

19. The dispensing clock of claim 18, wherein each of the storage vessels of the plurality of storage vessels defines a spherical shape.

* * * * *